May 22, 1962 C. BEVILL 3,035,387
ROW CROP GATHERER
Filed April 24, 1959 4 Sheets-Sheet 1

Claude Bevill
INVENTOR.

BY *Clarence A. O'Brien*
*and Harvey B. Jackson*
Attorneys

May 22, 1962 C. BEVILL 3,035,387
ROW CROP GATHERER
Filed April 24, 1959 4 Sheets-Sheet 2
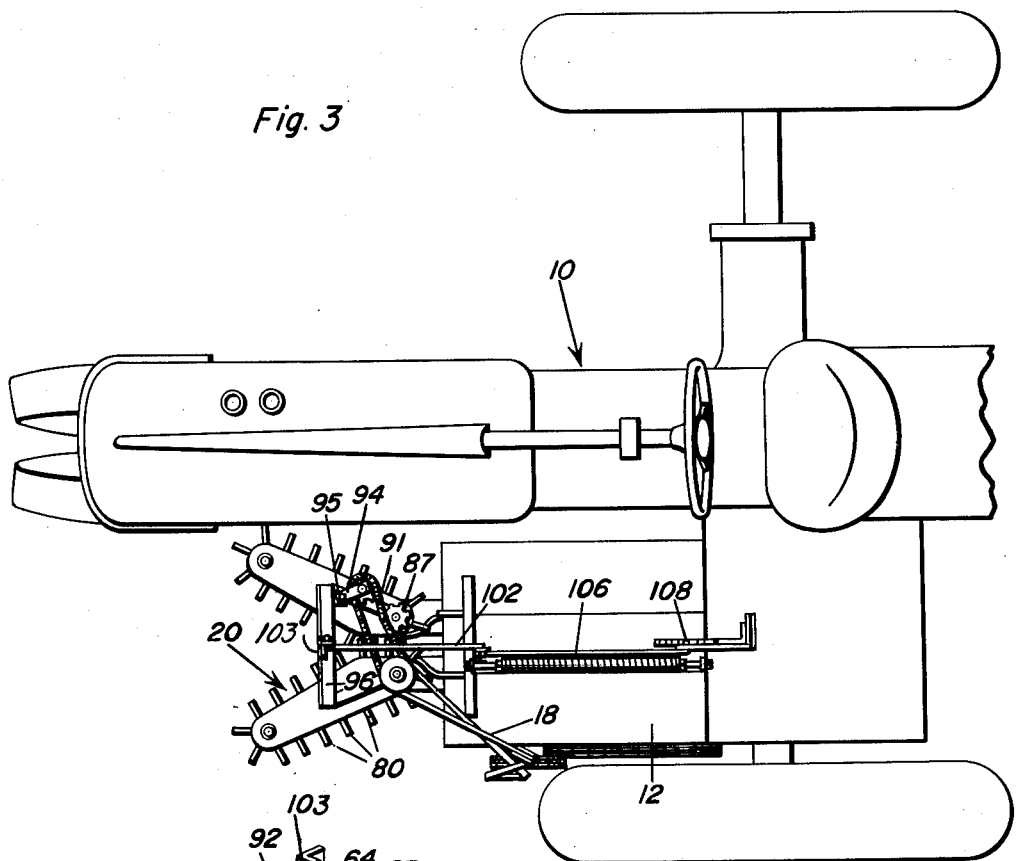
Fig. 3
Fig. 4
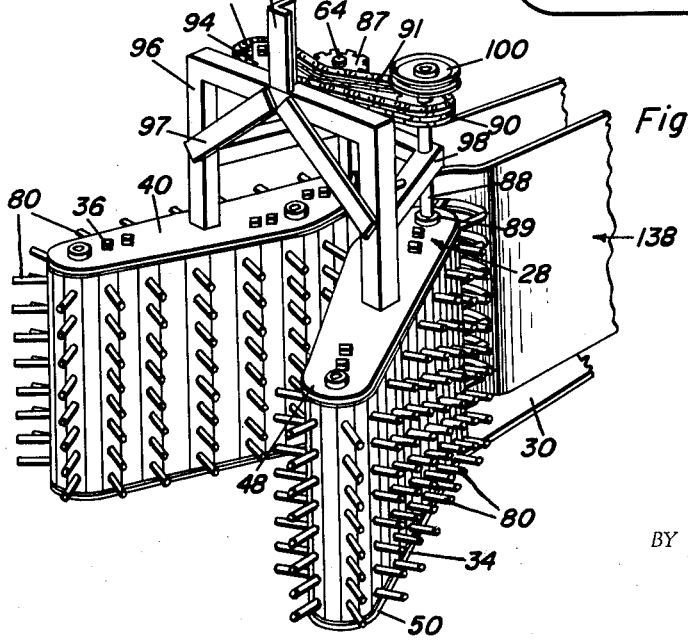
Claude Bevill
INVENTOR.

May 22, 1962  C. BEVILL  3,035,387
ROW CROP GATHERER
Filed April 24, 1959  4 Sheets-Sheet 3

Claude Bevill
INVENTOR.

May 22, 1962 C. BEVILL 3,035,387
ROW CROP GATHERER
Filed April 24, 1959 4 Sheets-Sheet 4

Claude Bevill
INVENTOR.

United States Patent Office 3,035,387
Patented May 22, 1962

3,035,387
ROW CROP GATHERER
Claude Bevill, 202 N. Van Buren, San Angelo, Tex.
Filed Apr. 24, 1959, Ser. No. 808,675
6 Claims. (Cl. 56—28)

This invention relates to cotton harvesting and more particularly to a cotton saver apparatus.

An object of the invention is to provide a cotton saving device for greatly reducing or eliminating waste of cotton in the process of harvesting. The waste referred to is the cotton that falls from the mouth of the cotton stripper of a conventional harvester.

Presently used cotton strippers have a type of front section which the cotton saving device of this invention will replace in the practice of the invention. The device conditions the plants into erect positions to enable them to enter the conventional stripper in a more satisfactory position.

To the extent indicated above the cotton saver device provides an improvement in commercially available cotton harvesters. Further, this device will enable the cotton stripper to travel faster through the field that is, to the capacity of the machine.

Briefly, the cotton saver is composed of a pair of forwardly and outwardly extending sections, each having endless conveyors provided with a plurality of teeth. The sections are arranged to form a throat within which the cotton plants are received as the harvester is moved forward in a cotton field. The front of each section is tilted downwardly so that the teeth barely touch the soil or operate at a slight distance above the soil level whereby minimum difficulty is encountered by large stones striking the teeth. The teeth gather the plants and present them in an erect position to the harvester.

In the arrangements specified, the saver gathers the cotton bows of those plants that are not perfectly erect in the rows. As this cotton is placed erect and the harvester moved forward the cotton bows are guided into the throat and other mechanism of the harvester, this mechanism being conventional. The only portion of a conventional harvester which is altered by the invention is the front thereof.

The harvester front in accordance with this invention is vertically adjustable with reference to the frame of the harvester and also, is vertically adjustable together with the harvester frame. This allows the cotton saver device to be raised from the ground, then tilted forward to let the teeth only touch the ground, thereby avoiding many rocks which would cause damage to any part of the stripper mechanism. Further, as described previously it is often necessary to lift the cotton slightly because the plants are not always perfectly erect in an ideal position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a top view of the structure shown in FIGURE 1.

FIGURE 4 is an enlarged perspective view of the cotton saver device.

Figure 1:
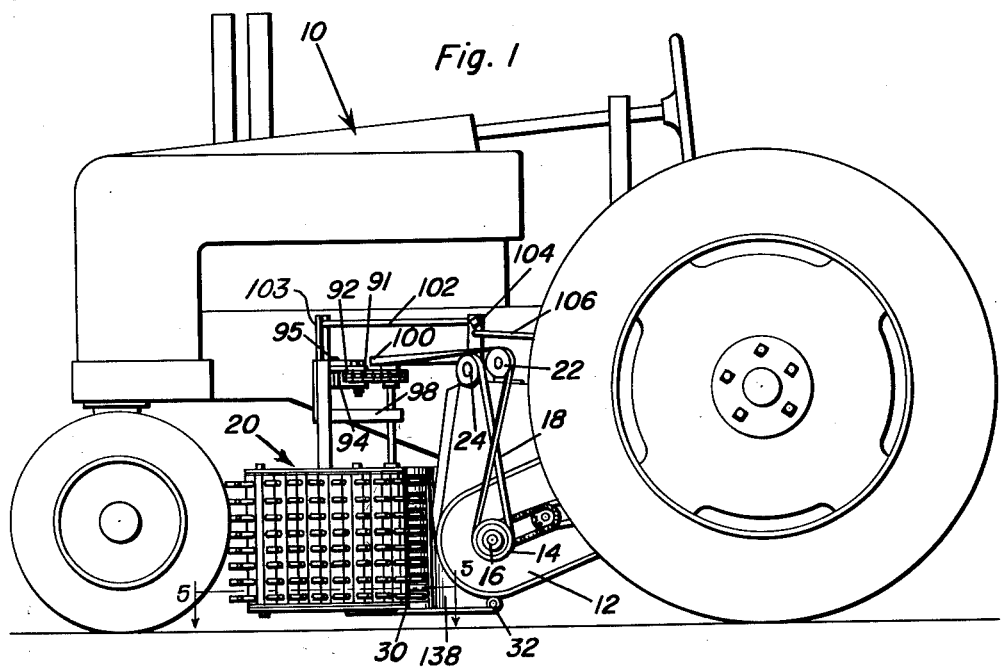
FIGURE 1 is a side view of a conventional tractor, a portion of a conventional cotton harvester, and a cotton saver front section applied to the harvester in lieu of one or more of the styles of front sections of harvesters that are commercially available on various manufacturers' makes of harvesters.
Figure 2:
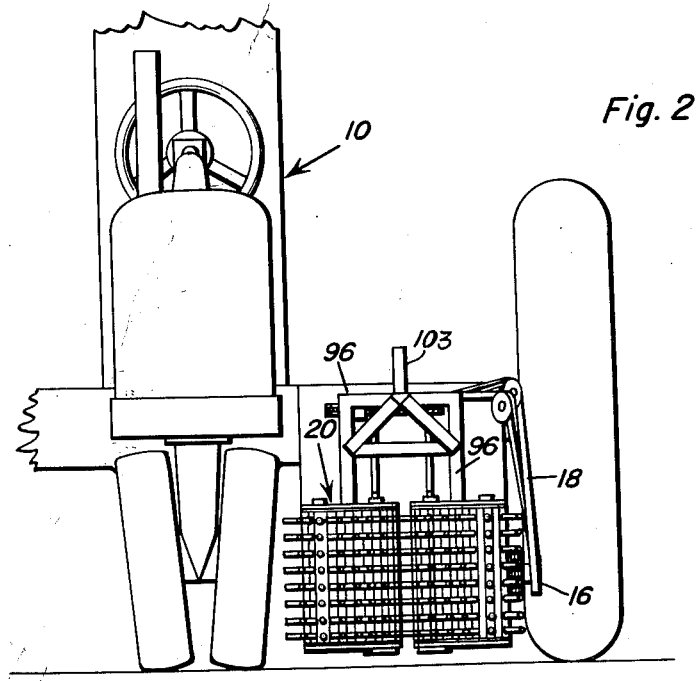
FIGURE 2 is a fragmentary front view of the structure shown in FIGURE 1.

In the accompanying drawings conventional tractor 10 is shown with a part of a conventional cotton harvester 12 mounted thereon. Cotton harvester 12 is capable of being vertically adjusted to selected elevations, this being a feature of all commercially available harvesters of the type diagrammatically shown in the drawings. Further, pulley 14 is attached to a shaft 16 that protrudes laterally outwardly from the harvester 12, and there is a belt 18 entrained around the pulley. This belt is used to obtain power for operation of the cotton saver device 20 in coordination with the operation of the harvester. Belt 18 together with guide pulleys 22 and 24 around which the belt is entrained and carried by the structure of harvester 12, are added to the conventionl harvester so that the cotton saver device 20 may be actuated. Cotton saver device 20 is used as a replacement for the conventional, that is, manufacturer's supplied front section of harvester 12.

Figure 7:
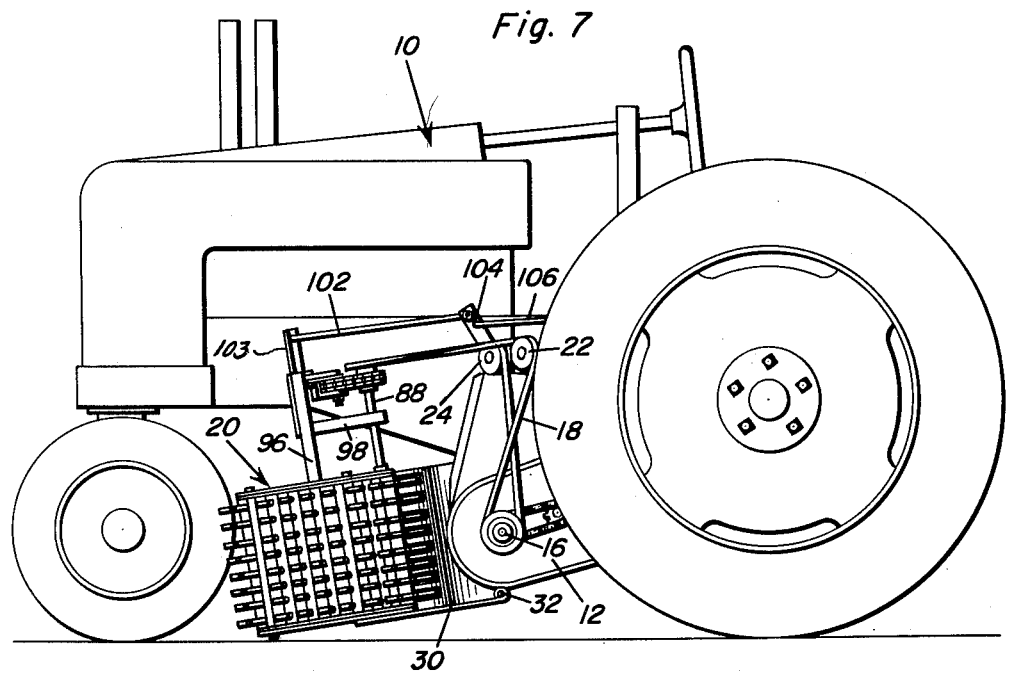
FIGURE 7 is a side elevational view similar to FIGURE 1 but showing the device in an adjusted position closer to the soil.
Figure 8:
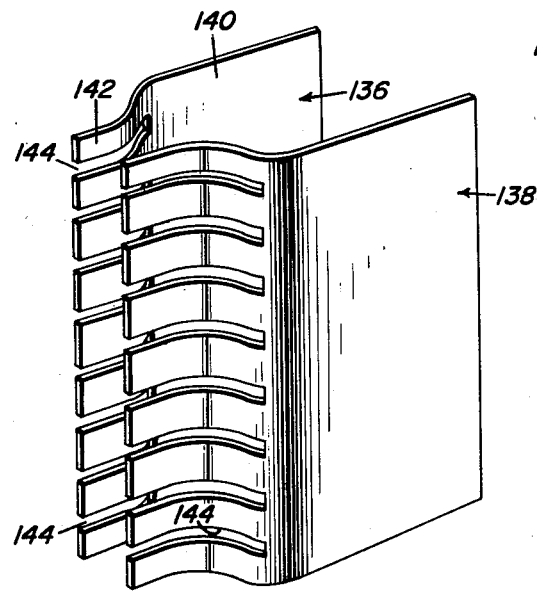
FIGURE 8 is an enlarged perspective view of the cotton stripper used with the teeth of the device in FIGURE 4.

Device 20 has a main frame 28 functioning as the structural support for the moving parts thereof. This main frame has a bottom plate 30 which is attached by hinge 32 to the lower structure of harvester 12 at the front thereof (FIGURES 1 and 7). Frame 28 has two sections 34 and 36. Section 34 and section 36 are identical. Section 36 has an upper plate 40 and a lower plate 42 held parallel and spaced apart by braces 44 and 46 that are welded or otherwise secured to the upper and lower plates. Section 34 has upper plate 48 and lower plate 50 held spaced apart and parallel by braces 52 and 54 extending therebetween and rigidly secured to the plates.

Figure 6:
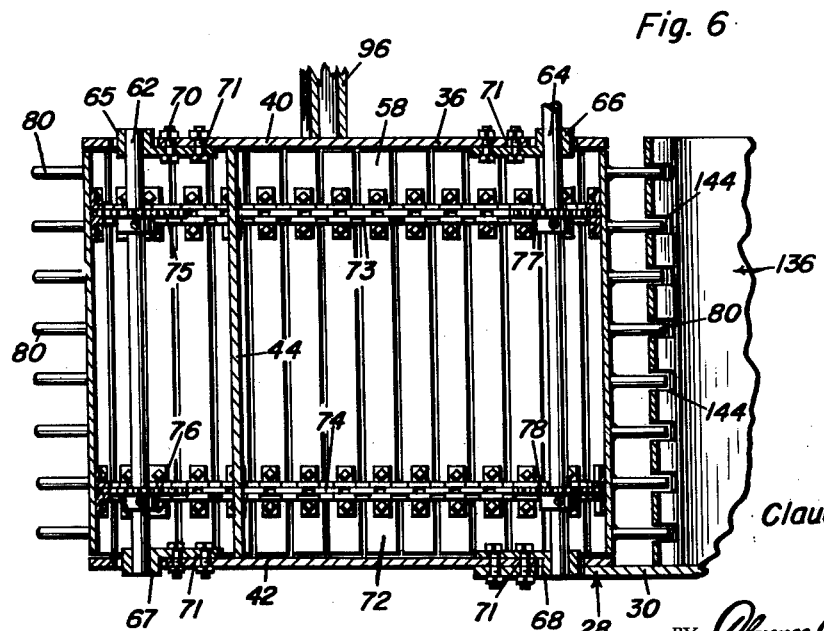
FIGURE 6 is a sectional view taken on the line 6—6 of FIGURE 5.

Endless slat conveyor 58 is in section 36, and endless slat conveyor 60 constitutes part of section 34. Each conveyor is constructed identically. Conveyor 58 is shown in detail in FIGURE 6 and consists of a pair of spaced shafts 62 and 64 parallel to each other and supported at their ends in bearings 65, 66, 67 and 68. Each bearing is connected by bolts 70 to the plates 40 and 42, and the bolts are operable in slots 71 enabling the shaft to be laterally displaced limited distances to function as tighteners for the endless slat conveyors.

Conveyor 58 has a number of similar slats 72, and there are chains 73 and 74 attached to the inner surfaces of the slats. Sprockets 75 and 76 are secured to shaft 62 and sprockets 77 and 78 are secured to shaft 64. Sprockets 75 and 77 engage chain 73 and sprockets 76 and 78 engage chain 74 thereby requiring all slats to be driven in unison.

Each slat has a row of teeth 80 secured to its outer surface. The teeth project outwardly from the plane of the outer surface of each slat, and since there are a plurality of slats parallel to each other, the teeth are arranged in rows. These teeth engage the cotton plants and gather up the low bows, lifting them so that the cotton plants are temporarily held erect and collected.

Shaft 64 extends upwardly through plate 40 and has a sprocket 87 attached thereto by which to drive shaft 64 and the endless slat conveyor 58. Shaft 88 which constitutes a part of section 34 and which corresponds to shaft 64, extending upwardly through its bearing 89 has a sprocket 90 secured thereto. Chain 91 is entrained around sprocket 90 and around an idler sprocket 92. One flight of the chain 91 engages a portion of the periphery of sprocket 87 thereby causing sprocket 87 to be rotated in unison with the rotation of sprocket 90. The way that the chain 91 engages sprockets 90 and 87 enables these sprockets to be rotated in the opposite directions so that the endless slat conveyors can be similarly operated in the opposite direction and in timed relation to the harvester. Sprocket 92 is mounted on a bracket 94, the latter being adjustable as to position by bolt 95 which holds it fastened to the upstanding yoke 96. The yoke 96 is reinforced by braces 97 and is secured at its lower ends to the upper plates 48 and 40 of sections 34 and 36. Rearwardly extending essentially U-shaped bracket 98 that is fixed to yoke 96, has apertures therein to function as additional bearings for the shafts 88 and 64 respectively.

Belt 18 extends upwardly from pulley 14 and in a lateral direction as it is constrained and guided in its movement by pulleys 22 and 24. The belt is also entrained around a pulley 100 which is secured to the top extremity of shaft 88, above sprocket 90. Accordingly, the drive shafts of the two endless conveyors are driven in unison and in coordination with the actuation of the harvester 12.

There are means for tilting the device 20 in an up and down direction. These means consists of link 102 pivotally connected as seen in FIGURES 1, 3 and 7, to a short upstanding post 103 on yoke 96. This link is connected with a lever 104, and the lever extends upwardly from a pivotal mount on the top of harvester 12. Another link 106 is pivoted to lever 104 and to a quadrant locking mechanism 108 on the harvester. The quadrant locking mechanism has a dog and a quadrant and is, of itself, conventional, while the linkage connected thereto, including links 102 and 106 together with lever 104 are in an articulated arrangement at approximately the same vertical plane as occupied by hinge 32, so that the cotton saver device 20 may be raised and lowered with the front end thereof moved closer to or farther from the ground.

Figure 5:
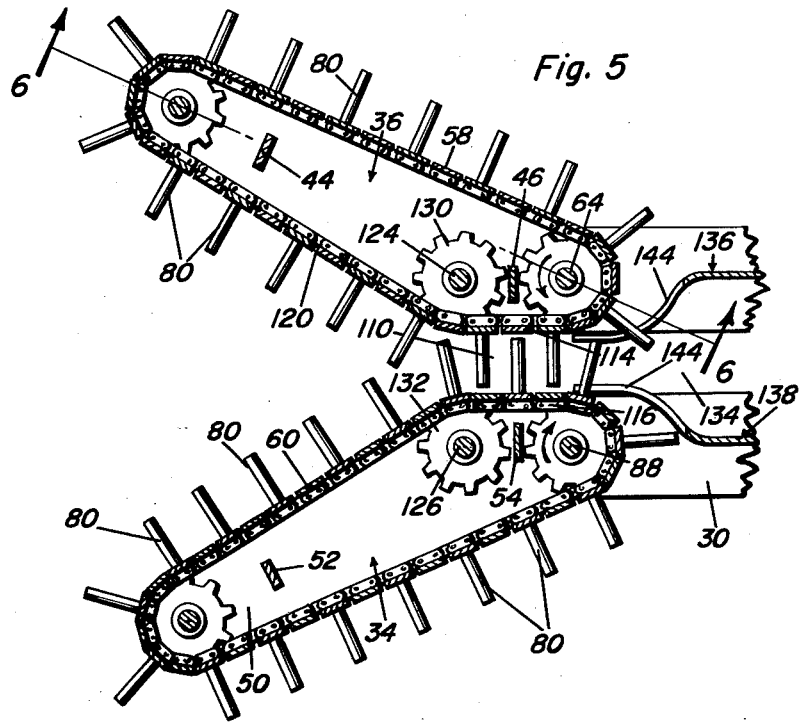
FIGURE 5 is a horizontal sectional view of the cotton saver device taken through a plane indicated by section line 5—5 in FIGURE 1.

Reference is now made to FIGURE 5 showing the configuration of the device in horizontal cross-section. Throat 110 is formed between the forwardly and outwardly diverging sections. The throat is made by short parallel sides 114 and 116 of the endless conveyors and is in registry with the diverging inlet 120 formed by the diverging sides of the endless slat conveyors on their frames. In order to confine the endless conveyor to the short parallel parts or sides 114 and 116, there are two additional shafts 124 and 126, each supporting a pair of endless conveyors engaging sprockets 130 and 132. Shafts 124 and 126 have their longitudinal axes parallel to the axes of the other shafts in the endless conveyor arrangements, but laterally offset from planes containing pairs of the end shafts of the endless conveyors.

Throat 110 is in registry with an inlet 134 of harvester 12. At this point there is shedder 136 for conveyor 58 and shedder 138 for conveyor 60. The shedders are similar, and each has a rear plate 140 and inwardly extending smoothly curved portions 142 provided with regularly spaced slots 144 through which the teeth of the slat conveyors operate. As the teeth move through slots 144 located at the inner ends of the conveyors, any part of the cotton plant retained on the conveyors is removed. The purpose of the shedders is to prevent the cotton plant and its fruit from being dragged from its desired course.

In operation, cotton saver device 20 is applied to the front end of harvester 12 by securing hinge 32 to a part of the structural framework of harvester 12 at the front lower portion thereof. The hinge axis is horizontal or approximately horizontal so that saver 12 is capable of being moved up and down with the leading or front edge thereof close to the soil (FIGURE 7) or spaced a short distance therefrom (FIGURE 1).

Manipulation of the locking mechanism 108 raises or lowers device 20 and holds it in the selected elevated position. When the harvester 20 is operated, shaft 16 thereof rotates thereby driving belt 18. Actuation of this belt causes shafts 88 and 64 to be simultaneously rotated and in opposite directions by the arrangement of endless chain 91 and the sprockets engaged by this chain. The result is that the endless slat conveyors 58 and 60 are actuated simultaneously so that the cotton plants are moved erect when received in entrance 134. The throat 110 accepts the cotton and it is shed from the fingers by shedders 136 and 138 which are mechanically secured to the lower frame member 30 so that they, too, are adjustable in an up and down tilting direction (about the axis of hinge 32) in unison with the adjustment of the two sections of the cotton saver device 20.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A cotton saving device adapted to be mounted at the inlet of a cotton harvester, said cotton saving device comprising a pair of sections having a frame, means including a hinge operatively associated with said frame and adapted to connect said frame to the harvester at the forward end thereof, said hinge having an essentially horizontal hinge axis so that the frame is tiltable in an up and down direction to selected positions, means connected with said frame for locking said frame in selected tilted positions, said device having a pair of endless conveyors, vertically extended and spaced teeth means mounted on said conveyors, said frame having portions that are spaced from each other and that individually support said endless conveyors with outwardly diverging portions forming a plant entrance with side portions parallel to each other at an inner end of the entrance to define a throat within which the teeth means on the individual conveyors pass in closely spaced and constant interdigitated relation to each other.

2. A cotton saving device adapted to be mounted at the inlet of a cotton harvester, said cotton saving device comprising a pair of sections having a frame, means including a hinge operatively associated with said frame and adapted to connect said frame to the harvester at the forward end thereof, said hinge having an essentially horizontal hinge axis so that the frame is tiltable in an up and down direction to selected positions, means connected with said frame for locking said frame in selected tilted positions, said device having a pair of endless conveyors, fingers connected to said conveyors, said frame having portions that are spaced from each other and that individually support said endless conveyors with outwardly diverging portions forming cotton plant entrances and side portions essentially parallel to each other at an inner end of the entrance to define a throat within which the fingers of the individual conveyors pass in closely spaced and constant interdigitated relation, a pair of shedders connected with said frame and having slots in which the fingers are operable, said shedders located rearwardly of said throat, the fingers of the endless conveyors moving through the slots of each shedder during the actuation of said conveyors.

3. The cotton saver of claim 2 wherein each conveyor is composed of a plurality of parallel slats, and a single row of fingers extending outwardly from the outer surface of each slat.

4. In a cotton saver adapted to be mounted at the front cotton receiving portion of a cotton harvester, said cotton saver adapted to place the cotton plants in an erect position and including a frame having a lower plate, means operatively associated with said lower plate and adapted to hingedly secure said lower plate to the forward end of the cotton harvester for hinged movement about a transverse axis, said frame having frame portions carried by said plate and laterally spaced from each other, a single endless conveyor supported by each frame portion, each conveyor provided with a plurality of spaced vertical rows of fingers, said conveyors being provided with spaced converging portions which define a tapered inlet and spaced parallel portions which define a throat through which said fingers pass in closely spaced and constant interdigitated relation as the conveyors are actuated, shedders carried by said plate and located rearwardly of said throat and having a plurality of slots through which said fingers are movable, and means connected with said endless conveyors for actuating said endless conveyors so that said parallel portions of the conveyors defining said throat are moving in the same direction toward said shedders.

5. In a cotton saver adapted to be mounted at the front cotton receiving portion of a cotton harvester, the combination of a frame having a lower plate, means operatively associated with said lower plate and adapted to hingedly secure said lower plate to the forward end of the cotton harvester for hinged movement about an essentially horizontal axis, said frame having portions carried by said plate and laterally spaced from each other, each portion supporting a single endless conveyor which is provided with a plurality of vertically spaced rows of fingers, said conveyors having forward end portions that are laterally diverging to form a tapered inlet and rearward parallel portions defining a throat at a rear end of said tapered inlet through which the fingers pass in closely spaced and constant interdigitated relation as the conveyors are actuated, cotton shredders carried by said plate and located rearwardly of said throat and having a plurality of slots through which said fingers are movable, means connected with said endless conveyors for actuating said endless conveyors so that said parallel portions of the conveyors defining said throat are moving in the same direction toward said shredders, a yoke secured to said portions of said frames and protruding upwardly therefrom, a bracket having apertures therein, said bracket being connected to said yoke, shafts constituting portions of said endless conveyors and portions of said means for actuating said conveyors and extending through said apertures in said brackets to form additional bearing support for such shafts, and means connected to said yoke for hingedly tilting said frame about the axis of said hinge to raise and lower the forward end of said frame.

6. In a cotton saver adapted to be mounted at the front cotton receiving portion of a cotton harvester, the combination of a frame having a lower plate, means operatively associated with said lower plate and adapted to hingedly secure said lower plate to the forward end of the cotton harvester for hinged movement about an essentially horizontal axis, said frame having portions carried by said plate and laterally spaced from each other, each portion supporting a single endless conveyor which is provided with a plurality of vertically spaced rows of fingers, said conveyors having forward end portions that are laterally diverging to form a tapered inlet and rearward parallel portions defining a throat at a rear end of said tapered inlet through which the fingers pass in closely spaced and constant interdigitated relation as the conveyors are actuated, cotton shredders carried by said plate and located rearwardly of said throat and having a plurality of slots through which said fingers are movable, means connected with said endless conveyors for actuating said endless conveyors so that said parallel portions of the conveyors defining said throat are moving in the same direction toward said shredders, a yoke secured to said portions of said frames and protruding upwardly therefrom, a bracket having apertures therein, said bracket being connected to said yoke, shafts constituting portions of said endless conveyors and portions of said means for actuating said conveyors and extending through said apertures in said brackets to form additional bearing support for such shafts, and means connected to said yoke for hingedly tilting said frame about the axis of said hinge to raise and lower the forward end of said frame, bring the teeth of the endless conveyors at the forward extremity of said frame close to the soil for cotton gathering while the remainder of the teeth of the endless conveyor and the balance of the frame are spaced from the soil to present a minimum portion of the conveyors to the soil as the cotton is gathered thereby avoiding the gathering of rocks with the cotton.

References Cited in the file of this patent

UNITED STATES PATENTS

| | | |
|---|---|---|
| 1,926,338 | Johnston | Sept. 12, 1933 |
| 2,134,867 | Fergason | Nov. 1, 1938 |
| 2,435,334 | Wurtele | Feb. 3, 1948 |
| 2,662,360 | Roscoe | Dec. 15, 1953 |
| 2,677,226 | Hyman | May 4, 1954 |
| 2,713,240 | West | July 19, 1955 |
| 2,731,780 | Witt | Jan. 24, 1956 |
| 2,834,175 | Knowles | May 13, 1958 |